July 6, 1948.                P. W. SLOAN                2,444,901
                               OIL SEAL
Filed May 31, 1945                              3 Sheets-Sheet 1
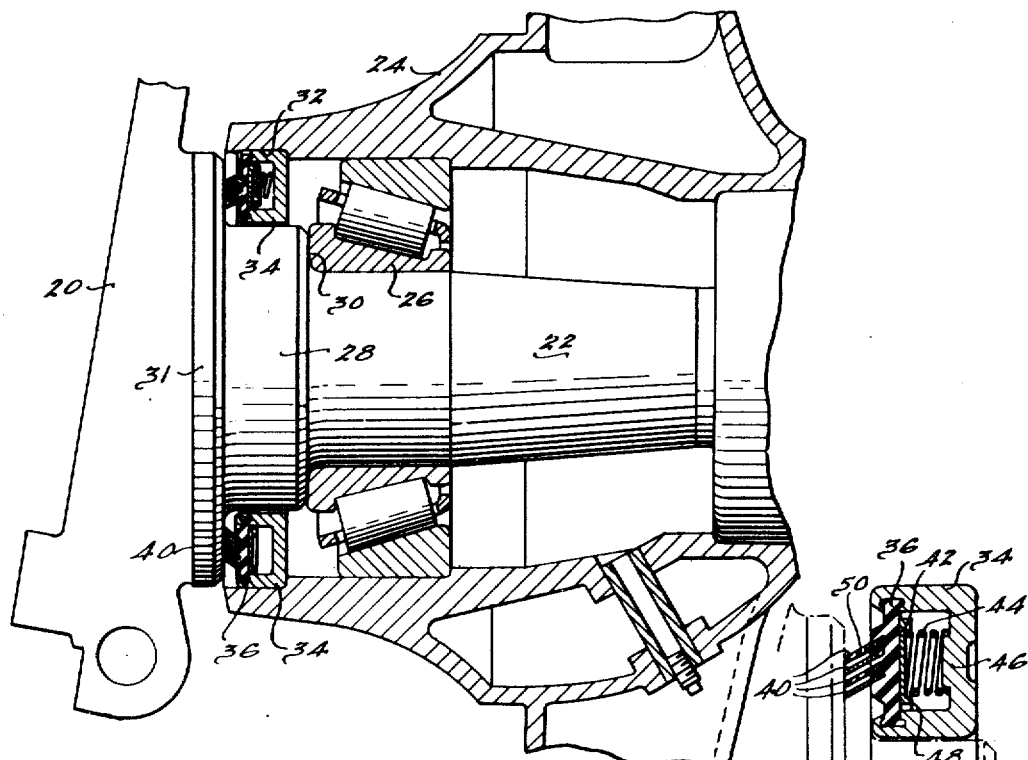
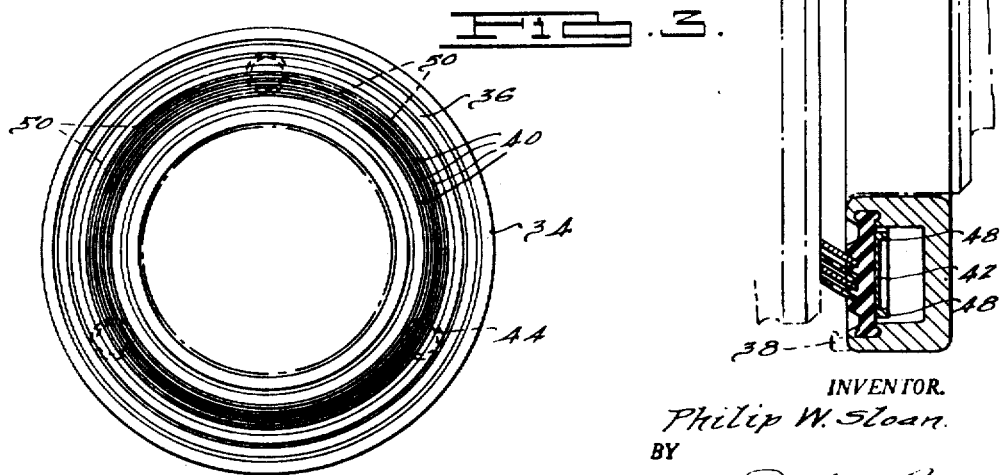
INVENTOR.
Philip W. Sloan.
BY
Harness, Dickey & Pierce.
ATTORNEYS.

July 6, 1948. P. W. SLOAN 2,444,901
OIL SEAL
Filed May 31, 1945 3 Sheets-Sheet 2

INVENTOR.
Philip W. Sloan.
BY
Harness, Dickey & Pierce.
ATTORNEYS.

July 6, 1948.                P. W. SLOAN                2,444,901
                              OIL SEAL Filed May 31, 1945                              3 Sheets-Sheet 3

INVENTOR.
Philip W. Sloan.
BY
Harness, Dickey & Pierce
ATTORNEYS.

Patented July 6, 1948

2,444,901

UNITED STATES PATENT OFFICE 2,444,901

OIL SEAL

Philip W. Sloan, Grosse Pointe, Mich.

Application May 31, 1945, Serial No. 596,863

13 Claims. (Cl. 286—11)

This invention relates to oil or grease seals of the character generally employed between a rotating shaft and a stationary part. It has particular relation to that form of oil seal in which the sealing takes place in connection with a radially directed surface on one of the relatively rotatable parts.

Objects of the invention include the provision of an improved oil seal of the general character described; the provision of an oil seal of the general type described capable of maintaining the seal between the relatively movable parts even though the radial surface of one of the parts at which the seal is effected is not truly perpendicular to the axis of rotation of the rotatable part; the provision of an oil seal of the general character described capable of yielding in accordance with inaccuracies of the associated sealing surface to accommodate it to such inaccuracies without breaking the seal between them; the provision of an oil seal of the character described including an annular body of readily yieldable rubber-like material supporting a plurality of ring-like sealing elements on one face thereof for engagement with the surface to be sealed, together with associated spring means constantly urging the rubber-like body in a direction to cause the sealing rings to bear against the associated surface to be sealed; the provision of a construction as above described including a cage in which the inner and outer margins of the yieldable annular body are embraced and between which and the yieldable body spring means are maintained under compression in operation; the provision of a construction as above described in which at least a part of the sealing rings are apertured to permit the flow of lubricant from one side thereof to the opposite side thereof in order to provide lubrication for the associated sealing surface; the provision of a construction as above described in which filter means are provided between adjacent pairs of sealing rings to entrap particles of foreign material; the provision of a sealing device as above described in which the sealing rings are of a frusto-conical nature; the provision of a sealing device of the character above described in which the sealing rings are of metal and are partially imbedded in the resilient member provided for supporting them; and the provision of an oil seal of new and novel construction providing improved operating characteristics.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a fragmentary, partially sectioned view taken axially through the spindle of the steering wheel of a motor vehicle, illustrating the application of the present invention thereto.

Fig. 2 is an end elevational view of the oil seal shown in Fig. 1, taken as looking from the left hand end thereof as shown in Fig. 1.

Fig. 3 is an enlarged diametrical sectional view of the oil seal shown in the preceding figure and in what may be considered to be in a normal condition of operation when associated with a perfectly formed part, the latter being shown in dot and dash lines.

Figure 4:
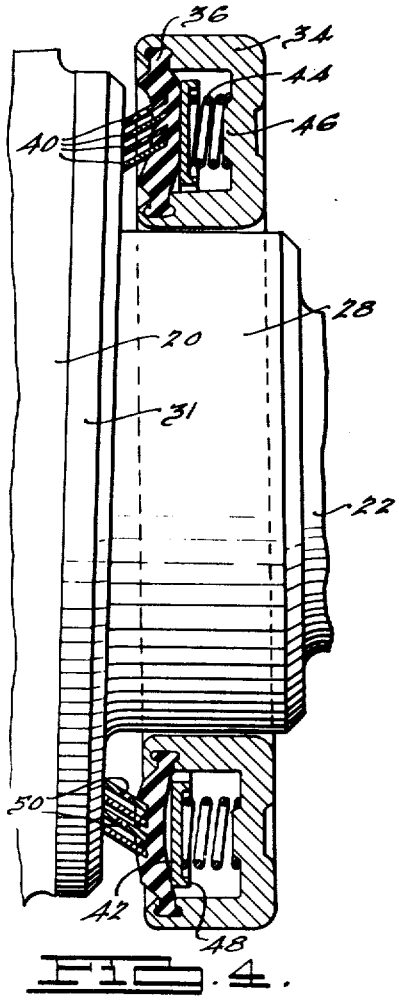
Fig. 4 is a view similar to Fig. 3 but on a slightly larger scale and illustrating the action of the oil seal of the present invention in connection with a part having an associated radially directed flange forming the cooperating sealing surface but in which the face of the flange although flat is not truly perpendicular to axis of rotation of the associated parts.

The present invention relates to oil seals of the type employed between a rotating part and a stationary part wherein one of the parts is provided with a surface lying, or intended to lie, in a plane perpendicular to the axis of rotation of the rotating part, the oil seal including a cage sealed as by press-fitting or the like to the other of the parts and having means arranged in rubbing contact with said surface to effect the desired seal. In the practice of the present invention it will be understood that it makes no difference whether the oil seal itself, that is the cage and the parts assembled therewith, is fixed with respect to the stationary part or is fixed with respect to the rotating part as it will be equally effective in either case. However, as a matter of illustration only in the drawings the oil seal is shown as being fixed with respect to the rotating part, the stationary part being provided with the cooperating surface.

It will also be understood that the oil seal of the present invention is applicable for use between any cooperating relatively rotatable parts, the particular application shown in the accompanying drawings being merely by way of illustration and not limitation.

Referring now to Fig. 1 the application of the present invention is shown in connection with a steerable wheel of a motor vehicle. As there shown the pivoted portion of a steering knuckle member 20 is provided with the usual wheel spindle 22 upon which the wheel hub 24 is rotatably mounted by means of bearing assemblies one of which is indicated at 26. The axially inner end of the spindle 22 is concentrically enlarged as at 28 to form a shoulder 30 providing a stop for the inner race for the bearing assembly 26. At the axially inner end of the portion 28 the member 20 is provided with a disc-like enlargement or flange 31 concentric with the spindle and the axially outer face of which is intended to be, and will be in most cases, located in a plane perpendicular to the axis of the spindle 22. The axially inner end of the hub 24 is counterbored as at 32 and pressfitted into this counterbore is the cage 34 of an oil seal formed in accordance with the present invention.

As best brought out in Figs. 2 and 3 the cage 32 is an annular member of channel-shaped section with the open sides of the channel opening toward the flange 31. Its open side is closed by a relatively narrow ring 36 of readily flexible material. In the broader aspects of the invention, the material from which the ring 36 is formed may be of any suitable character as long as it is sufficiently yieldable for the purpose required and sufficiently impervious to the passage of the liquid being sealed. It is preferably formed of rubber, either natural or artificial, or other suitable rubber-like material, and it may, if desired under some circumstances, be reinforced by fabric or other suitable material. Where employed for sealing a joint between a pair of relatively rotatable parts against escape of a hydrocarbon product it will ordinarily be desirable to form the ring 36 of an artificial rubber which will not be adversely affected by contact with a hydrocarbon. The ring 36 may be formed from natural rubber where the seal is employed for sealing of a pair of relatively rotatable parts against leakage of water. In any case the material selected for the ring 36 will preferably be unaffected by contact with the liquid being sealed.

The radially inner end and outer margins of the ring 36 are sealed to the corresponding walls of the cage 34 and such seal may be effected in any suitable manner. In the particular case shown these marginal edges are increased slightly in width to form inner and outer rims which are closely embraced by the material of the cage 34. The embraced relation shown may be obtained by initially forming the open edges of the channel of the cage 34 as indicated in dotted lines at 38 at the bottom of Fig. 3, then inserting ring 36 in the cage and thereafter rolling the portions 38 inwardly into embracing relation with respect to the radially inner and outer margins of the ring 36.

In accordance with the present invention the resilient or yieldable ring 36 supports a plurality of concentric, generally radially spaced and axially directed sealing rings arranged in sealed relation with respect thereto and which rings are adapted to extend into wiping or rubbing engagement with the opposed face of the flange 31, or its equivalent. These sealing rings are preferably, although not necessarily in all cases, formed of metal and preferably a metal having good wearing characteristics in association with the metal of the cooperating flange 31 or its equivalent. For instance where the flange 31 is of steel, then the sealing rings are preferably of bronze or the like. In the broader aspects of the invention the number of sealing rings may be varied to a greater or lesser extent depending upon the character of the seal required, the pressure to which the joint to be sealed is subjected to a practice, and other considerations. Likewise the sealing rings may be secured to or associated with the ring 36 in any suitable manner and the sealing rings themselves may be of any suitable conformation. The main requirement in any case is that the sealing rings be so connected to their corresponding yieldable ring member 36 that each is yieldable therewith with respect to the remaining sealing rings to an extent which may be small but yet material, and for a purpose which hereinafter will be more readily apparent.

In the particular construction shown in Figs. 1 to 5, inclusive, such sealing rings are indicated at 40 and each is of a frusto conical nature and relatively thin walled. They are arranged in concentric nested relation but radially spaced with respect to each other and with their corresponding axial faces at least initially located in corresponding planes. They are preferably spaced radially from the radially inner and outer walls of the cage 34 so as to lie within the axially flexible portion of the ring member 36. In the particular case shown the axially inner ends of the sealing rings 40 are imbedded in the material of the yieldable ring 36 and, where the latter is formed of rubber or rubber-like material, their imbedded ends are preferably vulcanized thereto. Where the sealing rings are of frusto-conical nature as in the case shown in Figs. 1 to 5 inclusive, then the rings are preferably so arranged as to provide an obtuse angle between that face thereof opposed to the fluid to be sealed and the associated face of the flange 31, as shown.

The sealing rings 40 or their equivalent are preferably of the same axial extent but regardless of their axial extent are so arranged with respect to their corresponding flexible ring member 36 or the equivalent, that the outer ends of all of them bear against the cooperating radially directed sealing surface, namely the axially outer face of the flange 31 in the construction illustrated in Figs. 1 to 5, inclusive. This is particularly so where the cooperating sealing surface is intended to be flat and perpendicular to the axis of rotation of the rotatable part.

In order to realize the benefits of the present invention, in mounting the various sealing rings 40 or their equivalent on the flexible ring 36 or its equivalent, each for a limited amount of movement with respect to the others, it is necessary that some means be provided for constantly urging the central portion of the flexible ring 36 axially outwardly. Spring means interposed between the central portion of the flexible ring 36 and the opposed wall of the cage 34 are employed for this purpose. Obviously such spring means may assume a variety of forms, as for instance, a single annular split or continuous wavy or meandering type of spring, a plurality of separate coil springs, or the like. Such spring means may be interposed directly between the flexible ring member and the opposed wall of the cage, as for instance as illustrated in modification shown in Fig. 12, or, as is preferable, a wear plate or the like may be interposed between the spring or springs and the flexible ring member. In the construction illustrated in Figs. 1 to 5 inclusive an annular wear or pressure plate or ring 42, of an inside and outside diameter larger and smaller, respectively, than the inside and outside diameter of the hollow interior of the cage 34, is provided in flat contacting relationship with respect to the axially inner face of the ring member 36, and a plurality of coil springs 44, shown in three in number and equally angularly spaced from each other about the axis of the spindle 22, are positioned between wear ring 42 and the opposed axial face of the cage 34. In order to maintain the springs 44 in position the axially inner wall of the cage 34 in line with each of the springs 44 is acted upon to extrude a portion of the metal thereof forwardly to form pilot 46, each adapted to be received within the corresponding end of the corresponding coil spring 44. In addition, preferably the inner and outer margins of the wear ring 42 are axially rearwardly turned as at 48, not only to give added rigidity to the wear ring 42 but to limit the radial movement of the axially outer ends of the springs 44.

With the construction described and referring to Figs. 1 to 3 inclusive, it will be understood that the cage 34 is so positioned in the axial length of the hub 24 that the springs 44 in pressing the central portion of the flexible ring 36 axially outwardly causes the axially outer ends of all the sealing rings 40 to bear against the opposed face of the flange 31 in sealing relation with respect thereto. Preferably, when the arrangement of all of the parts is that intended in the original design, the flexible ring 36 will be arranged with its inner and outer faces in flat relationship, that is not bowed either outwardly or inwardly, as illustrated in Fig. 3, although such bowing may occur when such intended relation of the parts is lacking.

Where four or more sealing rings such as 40 are thus provided it has been found that the seal established with the flange 31 is often so effective that there is need of some lubrication between the ends of those sealing rings 40 engaging the flange 31 and disposed radially behind the ring 40 most advanced in opposition to the direction of leakage tending to occur between the relatively rotatable parts. To provide a measure of lubrication in this respect and under such conditions, bleed holes such as 50 may be provided in alternate sealing rings 40 on the down stream side of that sealing ring 40 more advanced in the direction of the attempted flow of the fluid being sealed. This allows for a limited flow of the liquid being sealed and which has escaped past the first sealing ring, to the following rings to provide the desired lubrication.

An important advantage of the construction described is that the sealing device will continue to function properly over a material variation in distance between the outer face of the flange 31 and the cage 34, so that, for instance, in the embodiment shown in Fig. 1 the distance between the shoulder formed at the bottom of the counterbore 32 of the hub 24 and which serves to locate the cage 34 axially of the hub, and the outer face of the flange 31, does not require to be maintained within the close limits which would otherwise be required were it not for the ability of the central portion of the flexible ring 36 to move axially to the extent provided for in accordance with the present invention.

Thus in the event such distance is less than that intended, the central portion of the flexible ring 36 will move inwardly against the force of the springs 44, compressing the latter, in order to accommodate such lessened distance. On the other hand if such distance is greater than that intended, the springs 44 will push the central portions of the flexible rings 36 outwardly to maintain the outer ends of the sealing rings 40 in contact with the axial outer face of the flange 31. This same feature is of course of advantage where wear develops between the relatively movable parts resulting in increasing the original distance between the parts, the flexible member 36 in cooperation with the springs 44 flexing to accommodate such variations.

Figure 5:
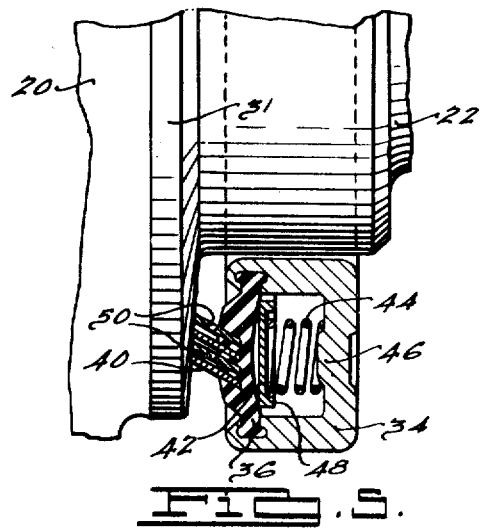
Fig. 5 is a smaller fragmentary view similar to that shown in Figs. 3 and 4 but illustrating the sealing face of the flange of the associated part as being of slightly conical nature, and Figs. 6 to 12 inclusive are fragmentary sectional views taken diametrically through modified forms of construction for the oil seal of the present invention.

There is another advantage of the present invention which is of equal importance and this is brought out in connection with Figs. 4 and 5. The sections shown in Figs. 4 and 5 are intended to be identical to that shown in Fig. 1 except only that these figures illustrate imperfect machining of the flange 31. Accordingly, the parts shown in Figs. 4 and 5 are indicated by the same numerals as employed in the preceding figures, the differences only being explained.

In Fig. 4 the flange 31 and particularly the axial outer face thereof while perfectly flat, is not arranged in true perpendicular relationship with respect to the axis of the spindle 22. Instead and because of some imperfection in machining and as may readily occur in production, the axis of the flange 31 is disposed at a slight angle (shown exaggerated) to the axis of spindle 22 so that the distance between the cage 34 and the axially outer face of the flange 31 at any particular point on the latter will uniformly increase and decrease as the hub 24 travels about the axis of the spindle 22. It would be impossible to provide an effective seal between the relatively rotating parts under such conditions with conventional forms of seals of the same general character. In accordance with the present invention and as brought out in Fig. 4, the flexible ring 36 in conjunction with the springs 44 will distort so as to maintain sealing rings 40 in contact with the axial outer face of the flange 31 during relative rotation between them. At the point where this spacing is the smallest, illustrated at the top of Fig. 4, the central portion of the flexible ring 36 will flex inwardly as shown, and at the point of maximum spacing illustrated at the bottom of Fig. 4, the central portion of the flexible ring 36 will be forced outwardly by the cooperating springs 44 to maintain engagement between the sealing rings 40 and the axial outer face of the flange 31. Thus perfected sealing is obtained by the structure of the present invention under this difficult condition.

Additionally there are instances where the flange 31 may be arranged in true perpendicular relationship with respect to the axis of the spindle 22 but in which, through some defect in machining, the axial outer face of the flange 31 may be of a flat frusto-conical nature instead of lying in a single plane, as illustrated in exaggerated form in Fig. 5. Under such conditions and in accordance with the present invention the central portion of the flexible ring 36 will yield either against or in accordance with the pressure on the cooperating springs 44 to maintain the free ends of the sealing rings 40 in the sealing engagement with respect to the axial outer face of the flange 31, thus maintaining the seal under such conditions. In this case each ring 40 is bodily displaced axially with respect to its adjacent ring or rings 40, while in the case shown in Fig. 4 each ring 40 tips with respect to its adjacent rings 40.

The seal of the present invention is of course adaptable to a variety of changes. For instance in the construction illustrated in Fig. 6 the cage 34a is identical to the cage 34 previously described except instead of providing a pilot such as 46 in line with each spring 44 a piloting plug 46a is threaded through the rear face of the cage 34a in axially parallel relation thereto and its inner end is formed for piloting engagement with respect to the corresponding spring 44. By threading the plugs 46a inwardly or outwardly the force which the springs 44 exert upon the backing ring 42 may be varied.

Figure 6:
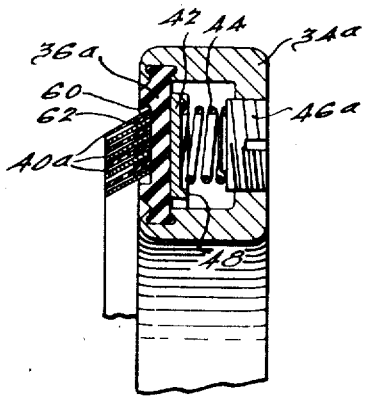

In the construction illustrated in Fig. 6 a greater number of sealing rings 40a are employed than in the first described construction. The sealing rings 40a are arranged in the same radially spaced and nested relation as the rings 40 previously described but instead of having inner ends imbedded in the flexible ring 36a, corresponding to the ring 36 previously described, in this case the outer axial face of the ring 36a is provided with a concentric annular recess 60 therein in which the axial inner ends of the sealing rings 40a are disposed. The radially outer of the sealing rings 40a cooperates with the radially outer wall of the recess 60 to maintain such outer sealing ring 40a concentric to the cage 34a. Preferably short spacer rings such as 62 are interposed between the axially inner ends of the adjacent sealing rings 40a to maintain them in properly radially spaced relation with respect to each other. The spacer rings 62 are preferably made from felt or other similarly flexible and preferably more or less porous material which will not materially restrict relative movement of the rings 40a axially with respect to each other, in order to accommodate them to various sealing conditions such as those heretofore pointed out particularly in connection with Figs. 4 and 5. The flexible ring member 36a being of a yieldable nature it will of course permit the axially inner ends of the sealing rings 40a to be partially imbedded therein under the influence of the springs 44 so as to provide an effective seal between the sealing rings and the member 36a during operation. There is only one disadvantage to the construction illustrated in Fig. 6 as compared to the previously described construction and that is that unless some cement or other suitable adhesive is employed between the sealing rings 40a and the flexible member 36a, the sealing rings will not form a unitary and self-contained assemblage for shipping purposes.

Figure 7:
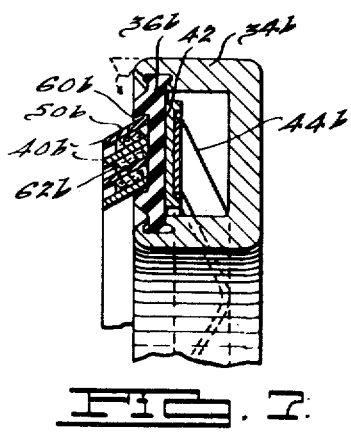

In the construction illustrated in Fig. 7 the cage member 34b is substantially the same as that previously described except that it neither has the pilot portion 46 nor the pilot screws 46a of the previously described constructions. The flexible member 36b may be substantially identical to the flexible member 36a of Fig. 6 and sealing rings 40b of substantially the same conformation as the sealing rings 40a are received within the recess 60b similar to the recess 60 previously described. In this case only four sealing rings 40b are shown employed. Also in this case the spacer 62b employed between the rings 40b and which, like the spacers 62 are of a flexible and readily yieldable nature, extend over a relatively greater axial length of the sealing rings 40b and in overlapping relationship with respect to the bleed openings 50b whereby not only to act as spacers, but particularly where formed from felt or like material serve to entrap particles of foreign material in them and also serve to filter any fluid that may tend to escape through the bleed openings 50b. Additionally, in the modification shown in Fig. 7, instead of employing a plurality of coil springs, a single flat spring 44b is employed, the springs 44b being of annular character and alternately axially bent in opposite directions into a wavy form. Its effect is of course the same as the combined effects of the springs 44 in the previously described constructions.

Figure 8:
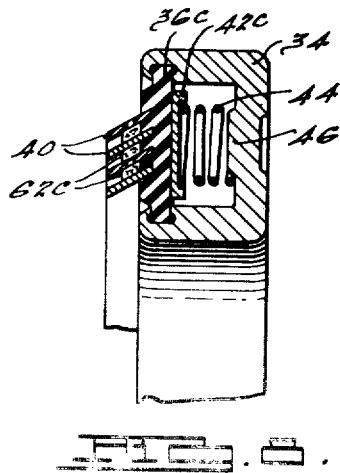

The construction illustrated in Fig. 8 is substantially the same as that illustrated in Figs. 1 to 5 inclusive except that in this case spacers 62c corresponding to the spacers 62 and 62b previously described are employed between the sealing rings 40, their effect being the same as the spacers 62b as far as entrapping particles of foreign material and filtering fluid escaping through the bleed holes 50 is concerned. The springs 44 are the same as those employed in Figs. 1 to 6, inclusive, but instead of employing a wear ring such as the wear ring 42, a cup-like disc 42c is positioned between each spring 44 and the flexible ring 36c. This is satisfactory particularly where a greater number of springs 44 are employed than in the previously described constructions.

Figure 9:
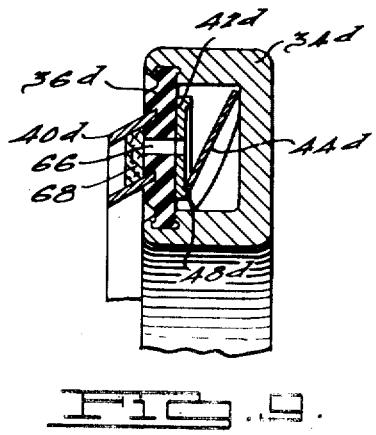

In the construction illustrated in Fig. 9 the cage 34d may be the same as the cage 34b previously described and the wear ring 42d may be identical to the wear rings 42 previously described. In this case only two sealing rings 40d are employed, relatively more widely spaced radially as compared to the previously described constructions, and their axially inner ends are imbedded in the flexible ring member 36d which otherwise is substantially the same as the flexible ring 36 first described. In this case, however, the ring 36d on a central radial axis is provided with a plurality of angularly spaced openings 66 therethrough and the wear ring 42d is provided with corresponding openings. The openings 66 permit breathing through the flexible ring member 36d and a spacer ring 68 is preferably interposed between the sealing rings 40d and in overlying relationship with respect to the outer ends of the openings 66 to filter any fluid flowing through the openings 66 and to entrap any foreign material coming in contact therewith. Additionally the openings 66 may serve to balance pressures on opposite sides of the member 36d as may be desirable in sealing against the escape of fluids under material pressures. Additionally, in this case a spring 44d is employed which is of ring-like character and formed from flat spring stock with its radially outer and radially inner edges bent into more or less wave-like form in radially alternating relation with respect to each other. The radially inner end of the spring 44d is adapted to engage the radially inner inturned edge 48d of the wear ring 42d, and the radially outer edge thereof to engage the radially outer wall of the interior space of the cage 34d to aid in maintaining the wear ring 42d concentric with the rest of the device.

Figure 10:
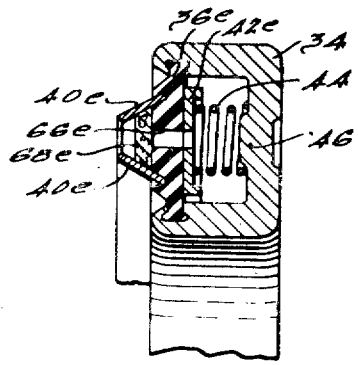

The construction illustrated in Fig. 10 combines the features of the construction shown in Fig. 9 with the spring construction shown in Figs. 1 to 5 inclusive and additionally in this case the two wear rings 40e which are employed and which are arranged in radially spaced relation with respect to each other are reversed in respect to each other, that is their inner ends which are imbedded in the flexible ring member 36e extend outwardly therefrom in converging relation with respect to each other as shown. The flexible ring 36e being provided with openings 66e therein corresponding to the openings 66 in Fig. 9, and the wear ring 42e being similarly formed, a ring 68e corresponding to the ring 68 in Fig. 9 is preferably interposed between the sealing ring 40e as shown.

Figure 11:
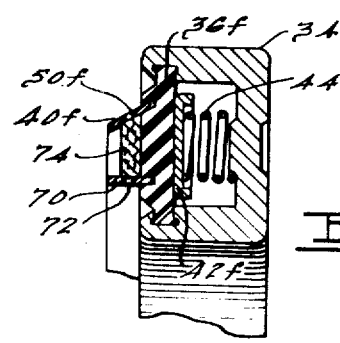

The construction shown in Fig. 11 is substantially identical to that shown in Fig. 10 except that the radially inner ring is formed as part of a hollow cylinder instead of the frusto-conical surface as in the construction illustrated in Fig. 10. It will be also noted that in this figure the outer sealing ring 40f is substantially identical to the sealing ring 40e of Fig. 10 except that in this case it is provided with bleed openings 50f therein. The inner sealing ring 70 is likewise provided with a plurality of bleed openings 72 and a ring 74 of felt or other equivalent material is interposed between the rings 40f and 70 and extends over the bleed holes 50f and 72 so that it not only restricts the flow of fluid between the rings but also filters such fluid to relieve it of foreign material. The flexible ring 36f in this case is not provided with openings therethrough as in the case of construction shown in Figs. 9 and 10 and, additionally, wear or pressure discs 42f are employed instead of rings, in a manner similar to the construction as illustrated in Fig. 8.

Figure 12:
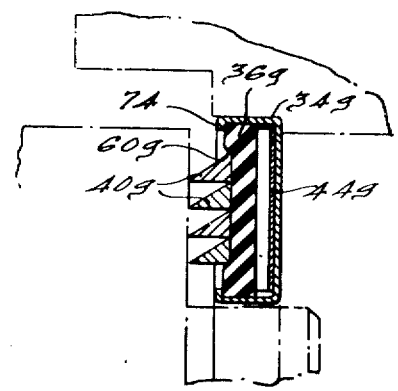

In Fig. 12 the cage 34g is illustrated as being formed from relatively thin sheet metal and the margins thereof at its open end inwardly turned as at 74 provide radially directed shoulders against which the radially outer and radially inner margins of the flexible sealing element 36g are pressed into sealing contact by means of a wavy or meandering spring ring 44g employed in place of the springs shown in the previously described construction. The spring thus serves a function additional to the functions of the springs previously described. In this case the flexible ring 36g is provided with recess 60g in its axially outer face in which recess a plurality of, illustrated as four, sealing rings 40g are received. In this case the rings 40g are of triangular sectional conformation arranged with their bases in flat contacting relationship with respect to the bottom of the recess 60g. The width of the bases of the sealing rings 40g is such that the rings 40g substantially fit one within the other so as to act through each other to maintain all of them as a group concentric with the cage 34g and the recess 60g. The bases of the sealing rings 40g in this case may be cemented or otherwise suitably adhered to the flexible ring member 36g if a unitary structure is desired, otherwise they may be left relatively loose and depend upon the pressure of the spring 44g upon assembly to maintain them in sealed and assembled relation with respect to the flexible ring 36g.

Other modifications of the invention will be apparent to those skilled in the art upon disclosures of the various structures shown in the drawings of the present application and the explanation thereof.

Having thus described my invention, what I claim by Letters Patent is:

1. A sealing device comprising an annular cage of generally channel section with the channel thereof opening axially outwardly thereof, a ring of readily yieldable material closing the open side of the channel and sealed thereto, a plurality of concentric and relatively rigid rings mounted on the outer face of said yieldable ring in concentric relation with respect thereto, in radially spaced relation with respect to each other, and radially spaced relation with respect to the radially outer and inner edges of said yieldable ring, and spring means cooperating between said yieldable ring member and the opposed inner face of said cage constantly urging the central portion of said resilient ring member axially outwardly with respect to said cage.

2. A sealing device comprising an annular metallic cage member of channel sectional conformation with the open end of the channel opening axially of said ring, a relatively narrow ring member closing the open side of said channel and sealed at its radially outer and inner edges to said cage member, a plurality of concentric and relatively rigid rings concentrically mounted upon the axial outer face of said ring member, said sealing ring members being radially spaced from and concentric with respect to each other, and spring means interposed between the first-mentioned ring member and the opposed wall of said cage, said first-mentioned ring member being formed of readily yieldable material whereby each of said sealing ring members is capable of a small amount of axial movement with respect to its neighbor whereby to enable the axial outer faces of said sealing ring members collectively to arrange themselves in conformance to a cooperating sealing surface lying at least partially outside of a plane perpendicular to the axis of said cage member.

3. A sealing device comprising an annular metallic cage member of channel sectional conformation with the open end of the channel opening axially of said ring, a relatively narrow ring member closing the open side of said channel and sealed at its radially outer and inner edges to said cage member, a plurality of concentric and relatively rigid rings arranged with their axially inner ends sealed with respect to the first-mentioned member, said sealing ring members being radially spaced from and concentric with respect to each other, and spring means interposed between the first-mentioned ring member and the opposed wall of said cage, said first-mentioned ring member being formed of readily yieldable material whereby each of said sealing ring members is capable of a small amount of axial movement with respect to its neighbor whereby to enable the axial outer faces of said sealing ring members collectively to arrange themselves in conformance to a cooperating sealing surface lying at least partially outside of a plane perpendicular to the axis of said cage member.

4. A sealing device comprising an annular metallic cage member of channel sectional conformation with the open end of the channel opening axially of said ring, a relatively narrow ring member closing the open side of said channel and sealed at its radially outer and inner edges to said cage member, a plurality of concentric and relatively rigid rings concentrically mounted upon the axial outer face of said ring member, and arranged with their axially inner ends imbedded in the first-mentioned ring member and sealed thereto, said sealing ring members being radially spaced from and concentric with respect to each other, and spring means interposed between the first-mentioned ring member and the opposed wall of said cage, said first-mentioned ring member being formed of readily yieldable material whereby each of said sealing ring members is capable of a small amount of axial movement with respect to its neighbor whereby to enable the axial outer faces of said sealing ring members collectively to arrange themselves in conformance to a cooperating sealing surface lying at least partially outside of the plane perpendicular to the axis of said cage member.

5. A sealing device comprising an annular cage of generally channel section with the channel thereof opening axially outwardly thereof, a ring of readily yieldable material closing the open side of the channel and sealed thereto, a plurality of concentric and relatively rigid sealing rings mounted on the outer face of said yieldable ring in concentric relation with respect thereto, in radially spaced relation with respect to each other, and radially spaced relation with respect to the radially outer and inner edges of said yieldable ring, spring means cooperating between said yieldable ring and the opposed inner face of said cage constantly urging the central portion of said resilient ring axially outwardly with respect to said cage, and flexible spacer elements interposed between the axially inner ends of said sealing rings.

6. A sealing device comprising an annular cage of generally channel section with the channel thereof opening axially outwardly thereof, a ring of readily yieldable material closing the open side of the channel and sealed thereto, a plurality of concentric and relatively rigid sealing rings mounted on the outer face of said resilient ring in concentric relation with respect thereto, in radially spaced relation with respect to each other, and radially spaced relation with respect to the radially outer and inner edges of said resilient ring, and spring means cooperating between said yieldable ring and the opposed inner face of said cage constantly urging the central portion of said resilient ring axially outwardly with respect to said cage, at least some of said sealing rings being provided with bleed openings therethrough providing passage of fluid from one side thereof to the other side thereof.

7. A sealing device comprising an annular cage of generally channel section with the channel thereof opening axially outwardly thereof, a ring of readily yieldable material closing the open side of the channel and sealed thereto, a plurality of concentric and relatively rigid sealing rings mounted on the outer face of said resilient ring in concentric relation with respect thereto, in radially spaced relation with respect to each other, and radially spaced relation with respect to the radially outer and inner edges of said resilient ring, and spring means cooperating between said yieldable ring and the opposed inner face of said cage constantly urging the central portion of said resilient ring axially outwardly with respect to said cage, alternate of said sealing rings being provided with openings therethrough for the flow of fluid between the opposite side thereof.

8. A sealing device comprising an annular cage of generally channel section with the channel thereof opening axially outwardly thereof, a ring of readily yieldable material closing the open side of the channel and sealed thereto, a plurality of concentric and relatively rigid sealing rings mounted on the outer face of said resilient ring in concentric relation with respect thereto, in radially spaced relation with respect to each other, and radially spaced relation with respect to the radially outer and inner edges of said resilient ring, spring means cooperating between said yieldable ring and the opposed inner face of said cage constantly urging the central portion of said resilient ring axially outwardly with respect to said cage, at least some of said sealing rings having openings therethrough, and spacer means formed of a readily yieldable material pervious to the passage of fluid therethrough interposed between said sealing rings and overlying said openings whereby to filter fluid flowing through said openings.

9. A sealing device comprising an annular cage of generally channel section with the channel thereof opening axially outwardly thereof, a ring of readily yieldable material closing the open side of the channel and sealed thereto, a plurality of concentric and relatively rigid sealing rings mounted on the outer face of said resilient ring in concentric relation with respect thereto, in radially spaced relation with respect to each other, and radially spaced relation with respect to the radially outer and inner edges of said resilient ring, said sealing rings comprising frusto-conical members, and spring means cooperating between said yieldable ring and the opposed inner face of said cage constantly urging the central portion of said resilient ring axially outwardly with respect to said cage.

10. A sealing device comprising an annular cage of generally channel section with the channel thereof opening axially outwardly thereof, a ring of readily yieldable material closing the open side of the channel and sealed thereto, a plurality of concentric and relatively rigid sealing rings mounted on the outer face of said resilient ring in concentric relation with respect thereto, in radially spaced relation with respect to each other, and radially spaced relation with respect to the radially outer and inner edges of said resilient ring, said sealing rings comprising frusto-conical members arranged with their opposed surfaces in parallelism with respect to each other, and spring means cooperating between said yieldable ring and the opposed inner face of said cage constantly urging the central portion of said resilient ring axially outwardly with respect to said cage.

11. A sealing device comprising an annular cage of generally channel section with the channel thereof opening axially outwardly thereof, a ring of readily yieldable material closing the open side of the channel and sealed thereto, a plurality of concentric and relatively rigid sealing rings mounted on the outer face of said resilient ring in concentric relation with respect thereto, in radially spaced relation with respect to each other, and radially spaced relation with respect to the radially outer and inner edges of said resilient ring, said sealing rings comprising a pair of frusto-conical elements arranged one within the other and the walls of one converging axially in one direction and the walls of the other axially in the opposite direction, and spring means cooperating between said yieldable ring and the opposed inner face of said cage constantly urging the central portion of said resilient ring axially outwardly with respect to said cargo.

12. A sealing device comprising an annular cage of generally channel section with the channel thereof opening axially outwardly thereof, a ring of readily yieldable material closing the open side of the channel and sealed thereto, a plurality of concentric and relatively rigid sealing rings mounted on the outer face of said resilient ring in concentric relation with respect thereto, in radially spaced relation with respect to each other, and radially spaced relation with respect to the radially outer and inner edges of said resilient ring, spring means cooperating between said yieldable ring and the opposed inner face of said cage constantly urging the central portion of said resilient ring axially outwardly with respect to said cage, at least some of said sealing rings having openings therethrough, and spacer means formed of a readily yieldable material pervious to the passage of fluid therethrough interposed between said sealing rings and overlying said openings whereby to filter fluid flowing through said openings, said resilient ring having an opening therethrough between its radially inner and outer edges.

13. A sealing device comprising an annular cage of generally channel section with the channel thereof opening axially outwardly thereof, a plurality of individual radially spaced relatively rigid rings each mounted independently of the others and all of said rings disposed concentrically with respect to said cage and to each other at the open side of said channel, and means including a body of rubber-like material received in the channel of said cage and sealed to the radially outer and inner walls of said cage mounting said rings on said cage, said body being axially yieldable between its radially outer and inner edges whereby to render said rings shiftable to a limited extent independently of one another axially of said cage.

PHILIP W. SLOAN.

REFERENCES CITED

The following references are of record in the file of this patent:

UNITED STATES PATENTS

| Number | Name | Date |
|---|---|---|
| 2,015,831 | Winter | Oct. 1, 1935 |
| 2,182,892 | Fors | Dec. 12, 1939 |
| 2,373,443 | Armington | Apr. 10, 1945 |

---

Certificate of Correction

July 6, 1948.

Patent No. 2,444,901.

PHILIP W. SLOAN

It is hereby certified that error appears in the printed specification of the above numbered patent requiring correction as follows: Column 12, line 66, claim 11, for the word "cargo" read *cage*; and that the said Letters Patent should be read with this correction therein that the same may conform to the record of the case in the Patent Office.

Signed and sealed this 14th day of September, A. D. 1948.

[SEAL]

THOMAS F. MURPHY,
*Assistant Commissioner of Patents.* er, and radially spaced relation with respect to the radially outer and inner edges of said resilient ring, spring means cooperating between said yieldable ring and the opposed inner face of said cage constantly urging the central portion of said resilient ring axially outwardly with respect to said cage, at least some of said sealing rings having openings therethrough, and spacer means formed of a readily yieldable material pervious to the passage of fluid therethrough interposed between said sealing rings and overlying said openings whereby to filter fluid flowing through said openings, said resilient ring having an opening therethrough between its radially inner and outer edges.

13. A sealing device comprising an annular cage of generally channel section with the channel thereof opening axially outwardly thereof, a plurality of individual radially spaced relatively rigid rings each mounted independently of the others and all of said rings disposed concentrically with respect to said cage and to each other at the open side of said channel, and means including a body of rubber-like material received in the channel of said cage and sealed to the radially outer and inner walls of said cage mounting said rings on said cage, said body being axially yieldable between its radially outer and inner edges whereby to render said rings shiftable to a limited extent independently of one another axially of said cage.

PHILIP W. SLOAN.

REFERENCES CITED

The following references are of record in the file of this patent:

UNITED STATES PATENTS

| Number | Name | Date |
|---|---|---|
| 2,015,831 | Winter | Oct. 1, 1935 |
| 2,182,892 | Fors | Dec. 12, 1939 |
| 2,373,443 | Armington | Apr. 10, 1945 |

---

Certificate of Correction

Patent No. 2,444,901.

July 6, 1948.

PHILIP W. SLOAN

It is hereby certified that error appears in the printed specification of the above numbered patent requiring correction as follows: Column 12, line 66, claim 11, for the word "cargo" read *cage*; and that the said Letters Patent should be read with this correction therein that the same may conform to the record of the case in the Patent Office.

Signed and sealed this 14th day of September, A. D. 1948.

[SEAL]

THOMAS F. MURPHY,
*Assistant Commissioner of Patents.*